Patented June 22, 1954

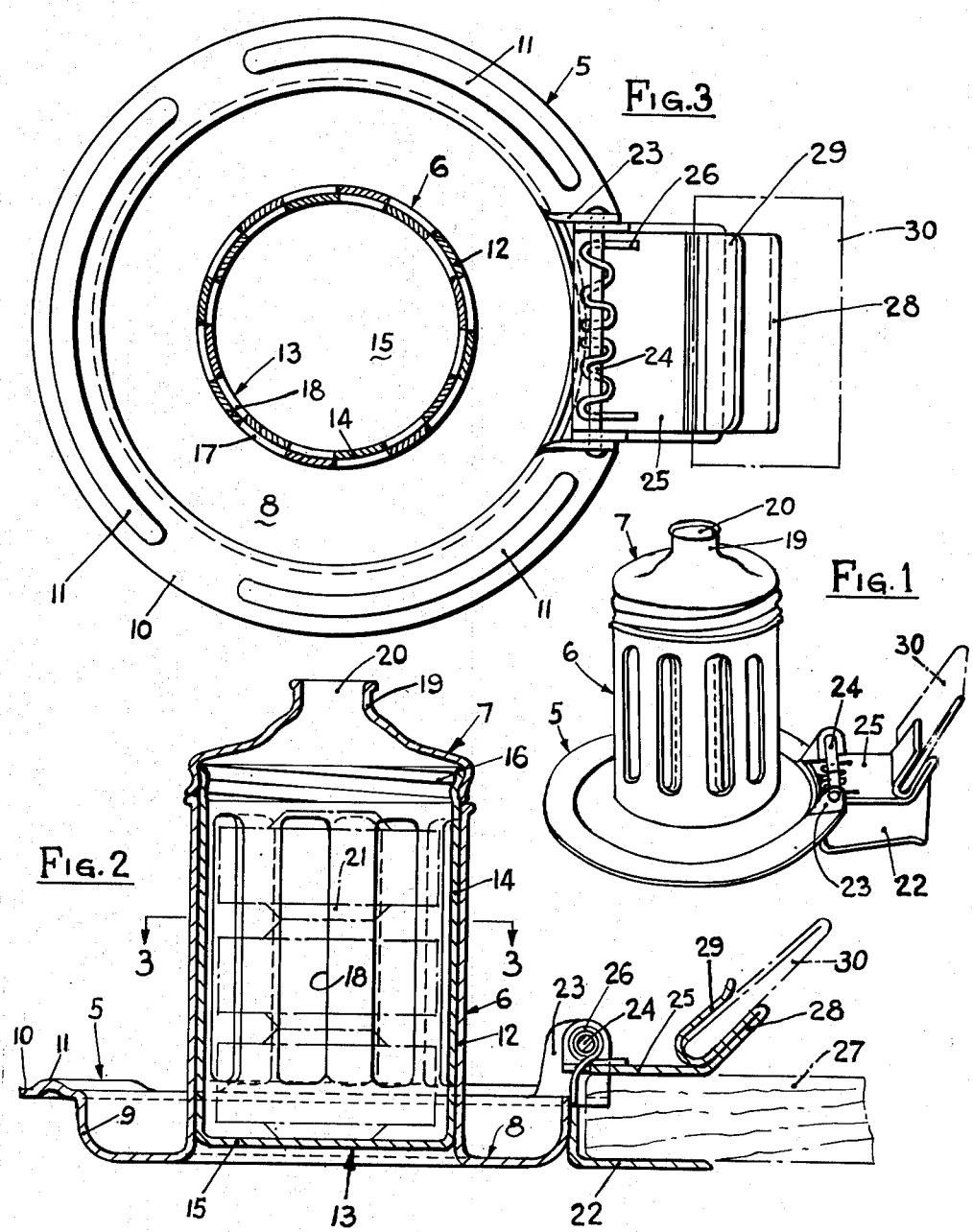

2,681,827

UNITED STATES PATENT OFFICE 2,681,827

ADJUSTABLE ODORIZER DEVICE

Bertha E. Racz, Philadelphia, Pa.

Application June 29, 1950, Serial No. 170,975

3 Claims. (Cl. 299—24)

The invention relates to a portable device for adjustably odorizing the air in a room. The novel device comprises a receptacle which is mounted on a supporting tray, is adapted for holding in its interior a slowly volatile air odorizing material and is provided with openings for circulation of air through its interior and past the material therein.

The new device may be placed at any desired place, such as on tables or other pieces of furniture, without serious danger of damage due to throwing it over or spilling the material therein. The tray attached to the receptacle not only presents a large supporting surface but also collects any of the material that may fall through the openings in the sides of the receptacle.

In addition, the tray may be formed as ash tray or for other similar purposes, and it may be provided with means for attaching it to the edge of a table, window sill or the like.

Further features of the invention consist in such formations of the device and its component parts which allow convenient and economical manufacture and assembly, which increase the air circulation through the receptacle, and which render the openings in the sides of the receptacle adjustable in size and completely closeable.

The features, objects and advantages of the invention will be more easily and completely understood from the embodiment illustrated in the drawing and from the following description thereof.

In the drawing:

Figure 1 is a perspective view of the novel device, indicating its attachment to the edge of a table or the like;

Figure 2 is a vertical central section, on a larger scale, through the device shown in Figure 1; and Figure 3 is a horizontal section along line 3—3 of Figure 2.

The main elements of the illustrated embodiment of the invention are: a tray 5, a cylindrical receptacle 6 and a cover or lid 7.

The tray has a flat bottom 8, a circumferential rim 9 and an outwardly projecting flange 10 along the top margin of rim 9. Flange 10 is formed with projections 11 or similar known formations to provide supports for cigars or cigarettes.

Receptacle 6 comprises a cylindrical part 12, formed in one piece with or otherwise secured to bottom 8 of the tray, and an inner cup-shaped part 13 telescopingly fitting with its cylindrical portion 14 into part 12 and having a bottom wall 15. Cover 7 is screw threaded at 16 on inner cylinder 14.

The cylinders 12 and 14 are provided with circumferentially equally spaced openings or slots 17 and 18 respectively. The openings are so arranged and dimensioned that, by relative rotation of the cylinders 12 and 14, they may be brought into registry or out of registry for partly or completely opening or blocking, respectively, passage for air between inside and outside of receptacle 6.

Lid 7 is of generally conical shape and provided with a central upward extension 19 surrounding an opening or hole 20 and affording a chimney effect for air entering through slots 17, 18 and leaving through hole 20.

When in use, odorizing material such as in the form of cakes 21, is housed in the receptacle 6. The cakes may have a generally known composition and comprise a slowly evaporating base material mixed with a perfume. The base material prevents quick evaporation of the perfume.

The discharge rate of the device is adjustable by adjusting the size of the effective width of slots 17 and 18 through relative rotation of cylinders 12 and 14. If not in use, slots 17 and 18 are completely closed by bringing them out of registry.

For refilling the receptacle, cup 13 may be pulled out of cylindrical part 12 and then be opened by taking off lid 7.

An extension or tongue 22 projects laterally beyond rim 9 of the tray at about or slightly above the level of tray bottom 8. Circumferentially spaced ears 23 are formed on flange 10 of the tray and formed as supports for a hinge pin 24 extending through them. A member 25 is hingedly supported by pin 24 and biased by spring 26 in the direction toward extension 22. The edge of a table, window sill or the like may be gripped between extension 22 and member 25 so as to support the new device.

For attachment to and removal from a table edge, member 25 has an upwardly and outwardly directed extension 28. This extension is in the shown embodiment provided with an upwardly open channel 29 for holding a book of matches 30 or other articles.

The provision of the receptacle for the odorizing material on an ash tray will effectively combat the objectionable smell of stale tobacco smoke, ashes and remnants. The tray will also catch any pieces of the odorizing material that may come loose and fall out through slots 17, 18.

Within the limits of basic combination disclosed herein, the invention is susceptible to modification in details. For instance the outer cylinder may be formed separately from the tray and subsequently connected therewith; the holes 17, 18 may have many different shapes and locations; the receptacle may have a shape different from the cylindrical shape; and the clamp for attachment to a table or the like edge may take different forms.

What is claimed is:

1. Portable air odorizing device comprising: a receptacle combined at its bottom with a radially projecting tray; a large filling opening at the top of said receptacle and a removable cover provided therefor; said receptacle having upright walls provided with openings and being rigidly connected with said tray; and cover means movably slidable on said upright walls for adjustably closing the openings therein.

2. Portable air improving device comprising: a tray; a cylindrical receptacle combined with said tray and having its cylindrical portion projecting upwardly therefrom; a filling opening at the upper end of said receptacle; the cylindrical portion comprising at least in part an inner wall and an outer wall slidably engaging each other and both provided with openings, said openings being arranged for complete, partial or out of registry in different relative positions of said inner and outer walls, one of said walls being rigidly connected with said tray.

3. Portable air odorizing device comprising: a receptacle combined at its bottom with a radially projecting tray; a large filling opening at the top of said receptacle and a removable cover provided therefor; said receptacle having upright walls provided with openings; cover means connected with said tray and movably slidable on said upright walls for adjustably closing the openings therein; and a clamp on the outer margin of said tray adapted for attaching the device to the edge of a board such as of a table top.

References Cited in the file of this patent

UNITED STATES PATENTS

| Number | Name | Date |
|---|---|---|
| 105,257 | Ryder | July 12, 1870 |
| 439,317 | Allen | Oct. 28, 1890 |
| 603,427 | Gennert | May 3, 1898 |
| 727,597 | Day | May 12, 1903 |
| 1,665,659 | Evans | Apr. 10, 1928 |
| 2,438,129 | Rich | May 23, 1948 |

FOREIGN PATENTS

| Number | Country | Date |
|---|---|---|
| 734,831 | France | Aug. 8, 1932 |